M. F. MULLINS.
COMB.
APPLICATION FILED MAR. 11, 1916.
1,266,704.
Patented May 21, 1918.
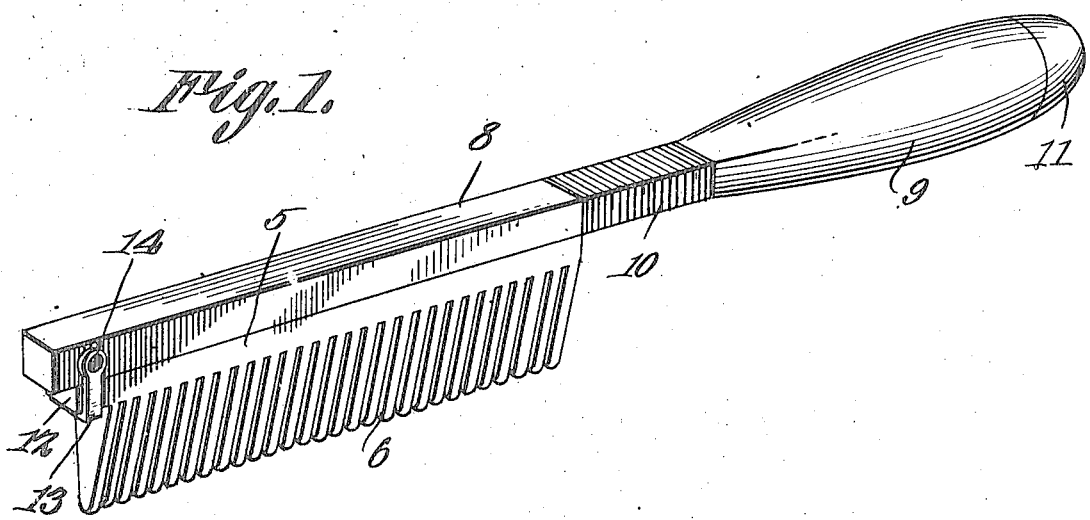
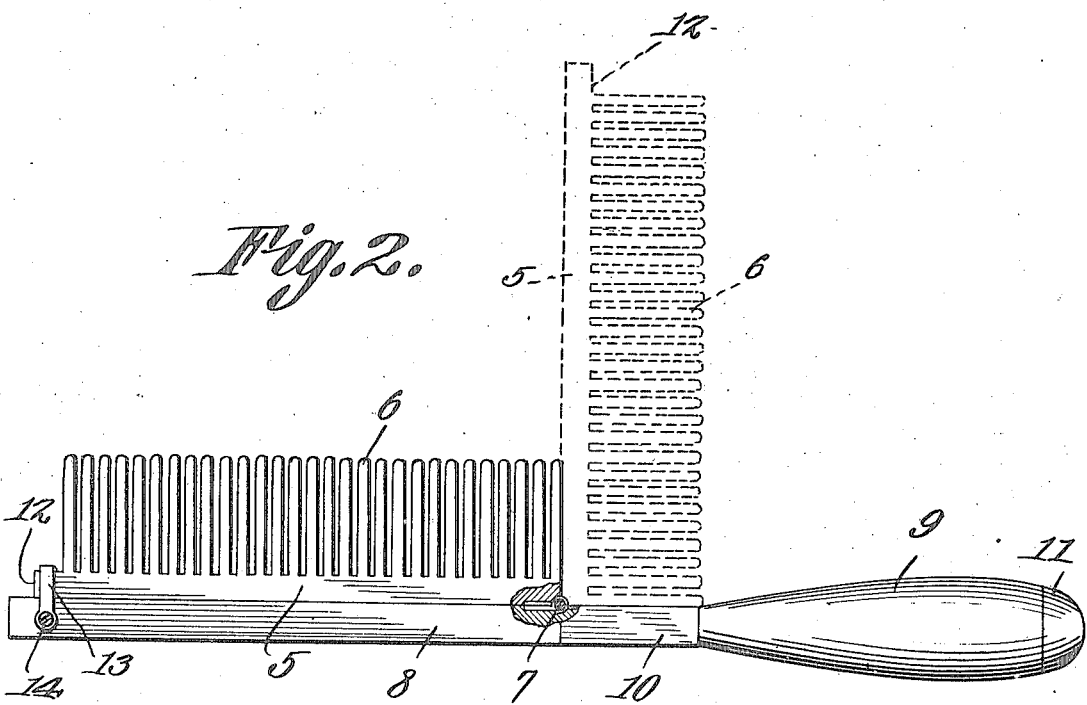
Moses F. Mullins
Inventor,

# UNITED STATES PATENT OFFICE.

MOSES F. MULLINS, OF NASHVILLE, TENNESSEE.

COMB.

1,266,704.

Specification of Letters Patent.  Patented May 21, 1918.

Application filed March 11, 1916. Serial No. 83,635.

*To all whom it may concern:*

Be it known that I, MOSES F. MULLINS, citizen of the United States, residing at Nashville, in the county of Davidson and State of Tennessee, have invented new and useful Improvements in Combs, of which the following is a specification.

The comb which is the subject-matter of the present application for patent is designed more particularly for drying the hair after it has been shampooed, and also for straightening out kinky and curly hair after it has been washed, dried and properly oiled. The comb is so constructed that it can be heated without the comb proper, and more particularly the teeth thereof, coming in contact with the flame.

In order that the invention may be better understood, reference is had to the accompanying drawing, in which—

Figure 1 is a perspective view of the comb, and

Fig. 2 is a side elevation thereof, partly in section.

Referring specifically to the drawing, the comb proper is a metal bar 5 having teeth 6 on one side. The bar is pivotally connected at its butt end, by a suitable hinge 7, to a heating bar 8 provided with a wooden handle 9 secured by a ferrule 10, and having at its butt end a cap 11 for protection of the handle if it should fall and drop on this end.

The heating bar 8 is straight and flat, and the comb bar 5 is also straight and flat and so connected to the former that it may seat thereon, the length of the heating bar being such that it is in contact with the back of the comb bar throughout the entire length of the latter, with the exception of a short projecting end portion 12.

The end portion 12 is designed to be engaged by a bail 13 pivoted at 14 to the sides of the bar 8 close to the outer end thereof, so that the bail may be swung across said end and placed over the part 12, thereby holding the comb bar 5 securely clamped to the heating bar 8.

In use, the bail 13 is swung to release the comb bar 5, and the latter is swung outward from the heating bar 8 as shown dotted in Fig. 2. The heating bar may now be grasped by the handle 9 and held over a gas flame, lamp or other heating medium, and after it has been sufficiently heated, the comb bar is swung back in contact therewith and made fast by the bail. The heat of the bar 8 is quickly conducted to the comb bar 5 as these two bars are in contact with each other, and the comb is now ready for use, it being grasped by the handle 9 and carried through the hair in the ordinary manner. Thus it will be seen that the comb proper is heated without having been in contact with the flame, and the teeth thereof therefore remain clean and are not smutted. The comb will be constructed of brass, or of aluminum and copper alloy, or any other metal which is a good conductor of heat. The pivots 14 of the bail 13 are screws which may be tightened up if the bail should become loose from usage.

The butt end of the comb bar 5 is flat so that when said bar is swung back as shown dotted in Fig. 2, it may abut and rest on the flat side of the heating bar 8. The comb is thus held away from the heating bar while the latter is being heated.

The structure is devoid of complicated parts liable to get out of order, and the invention provides a handy and convenient device for the purpose stated. The preferred embodiment of the invention has been shown, but it will be understood that various changes and modifications in the structural details may be made without a departure from the invention as claimed hereinafter.

I claim:

The combination of a heating bar having a plane surface on one side and provided with a handle at one end, and a comb of heat-conducting material connected to the plane side of the heating bar adjacent to the handle end, the back of the comb being also plane and adapted to be placed in contact with the plane surface of the bar, and means for positively clamping the comb in such position.

In testimony whereof I affix my signature.

MOSES F. MULLINS.